United States Patent

[11] 3,582,022

| [72] | Inventor | Ralph R. Robinson |
| | | P.O. Box 668, Middlesboro, Ky. 40965 |
| [21] | Appl. No. | 810,601 |
| [22] | Filed | Mar. 26, 1969 |
| [45] | Patented | June 1, 1971 |

[54] ROTATING-WING AIRCRAFT
10 Claims, 5 Drawing Figs.

[52] U.S. Cl. ................................................. 244/17.21, 244/15
[51] Int. Cl. ...................................................... B64c 27/00
[50] Field of Search............................................ 244/17.19, 17.11, 17.21, 15, 17.17, 17.15; 415/185

[56] References Cited
UNITED STATES PATENTS

| 2,118,052 | 5/1938 | Odor................................ | 244/15 |
| 2,330,907 | 10/1943 | Odor et al...................... | 415/185 |
| 2,547,255 | 4/1951 | Bruel............................... | 244/17.19 |
| 2,918,229 | 12/1959 | Lippisch......................... | 244/15 |
| 2,922,277 | 1/1960 | Bertin.............................. | 244/15X |
| 2,971,724 | 2/1961 | Von Zborowski............. | 244/15X |
| 2,993,662 | 7/1961 | Odor................................ | 244/15 |

*Primary Examiner*—Milton Buchler
*Assistant Examiner*—Paul E. Sauberer
*Attorney*—Schmidt, Johnson, Hovey & Williams ABSTRACT: A rotating-wing aircraft is provided with a propeller assembly extending rearwardly from the rearmost end of its fuselage, such assembly being in the nature of tubular structure which receives the entire slipstream of a propeller that is rotatable therein about an axis that is aligned with the fuselage. An air scoop around the fuselage utilizes the dynamic pressure of the airstream in maintaining a flow of air to the tubular structure.

PATENTED JUN 1 1971　　　　　　　　　　3,582,022

INVENTOR.
Ralph R. Robinson

BY
Schmidt, Johnson, Hovey,
Williams & Chase.
ATTORNEYS.

ROTATING-WING AIRCRAFT

It is the object of my present invention to provide an aircraft of the kind having a rotative sustaining blade with tubular structure and air scoop features which will combine with such blade in affording increased propeller efficiency, thrust, lift and factors of safety, as well as greater speeds and higher altitudes.

Figure 1:
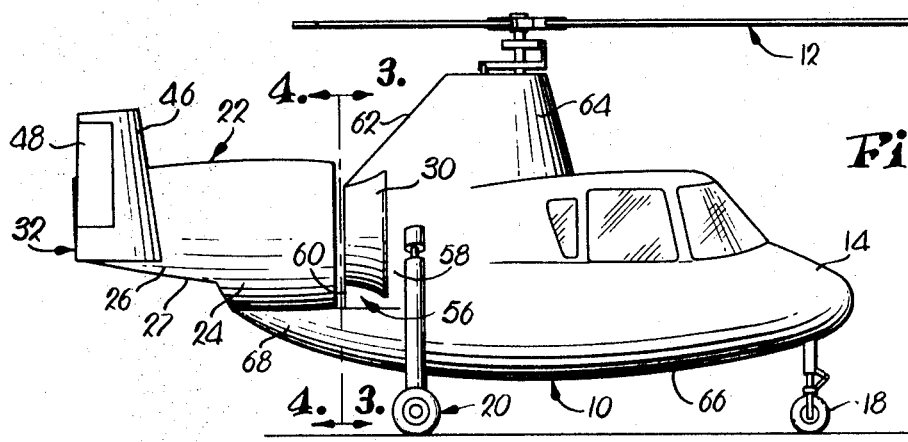
FIG. 1 is a side elevational view of a rotating-wing aircraft made pursuant to my present invention.
Figure 3:
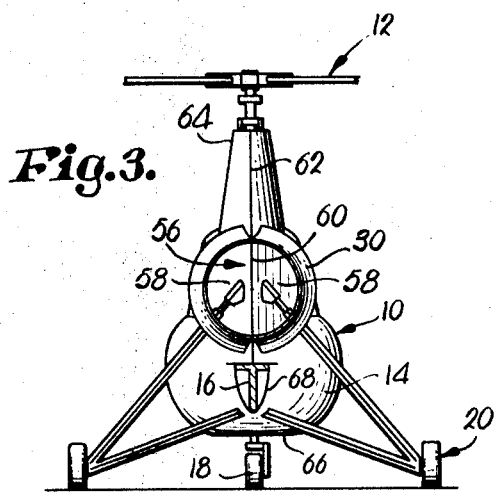
FIG. 3 is a cross-sectional view taken on line 3-3 of FIG. 1 looking forwardly.
Figure 4:
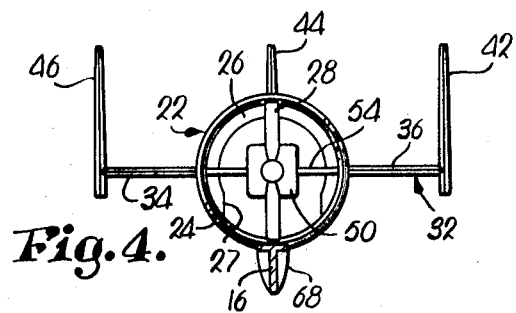
FIG. 4 is a cross-sectional view taken on line 4-4 of FIG. 1 looking rearwardly.

The airframe of the aircraft illustrated in the drawing, broadly designated 10, has a rotative sustaining blade 12 preferably of the autogyro type, a fuselage 14, a longitudinally extending beam 16, and tricycle landing gear which includes a front steering wheel 18 and a rear wheel and axle assembly 20.

An elongated, hollow body 22 is carried by beam 16 of airframe 10 and extends rearwardly from fuselage 14 of airframe 10. The longitudinal axis of body 22 is aligned with the normal path of travel of the aircraft. Body 22 includes a tubular leading section 24 and a substantially semitubular trailing section 26 having an open bottom 27. A power driven screw propeller 28 is carried by section 24 within the latter at its open front end for rotation about an axis that is coincident with the aforementioned axis of body 22.

The airframe 10 carries an air scoop 30 spaced forwardly of the body 22 and so disposed as to utilize the dynamic pressure of the airstream in maintaining a flow of air to the section 24 of body 22. The section 26 of body 22 is provided at its rearmost end with a tail 32 consisting of opposed, horizontal stabilizing surfaces 34 and 36 with their hinged control surfaces 38 and 40 respectively, and vertical stabilizing surfaces 42, 44 and 46, the surfaces 42 and 46 also having hinged control surfaces, one only being shown (for surface 46) and designated 48. A power plant 50, supported by post 52 and side arms 54 in section 24 is provided for driving the propeller 28.

Fuselage 14 has a rearmost end 56 that is disposed coaxially with scoop 30 and which terminates at the smaller, rear, open end of scoop 30. End 56 is attached to and extends through the frustoconical sleeve or scoop 30 and has sides 58 which converge as the body 22 is approached, terminating in a vertical edge 60 at the rear edge of scoop 30. Rear edge 62 of mast 64 slopes downwardly and rearwardly as the upper end of the edge 60 is approached. Thus, the longitudinal axis of body 22 is aligned with the axes of scoop 30 and rearmost end 56 of fuselage 14. Belly 66 of fuselage 14 has a rear terminal portion 68 that slopes upwardly and rearwardly as section 26 is approached. A flat top of portion 68 and the flat, outer, bottom face of section 24, both disposed rearwardly of edge 60, interengage and are interconnected.

Figure 5:
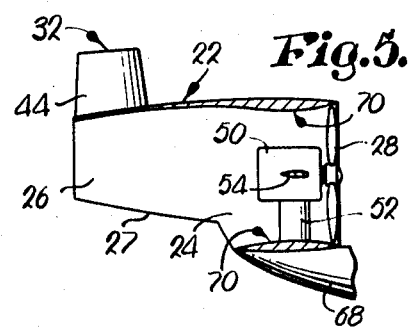
FIG. 5 is a fragmentary cross-sectional view taken on line 5-5 of FIG. 2.
Figure 2:
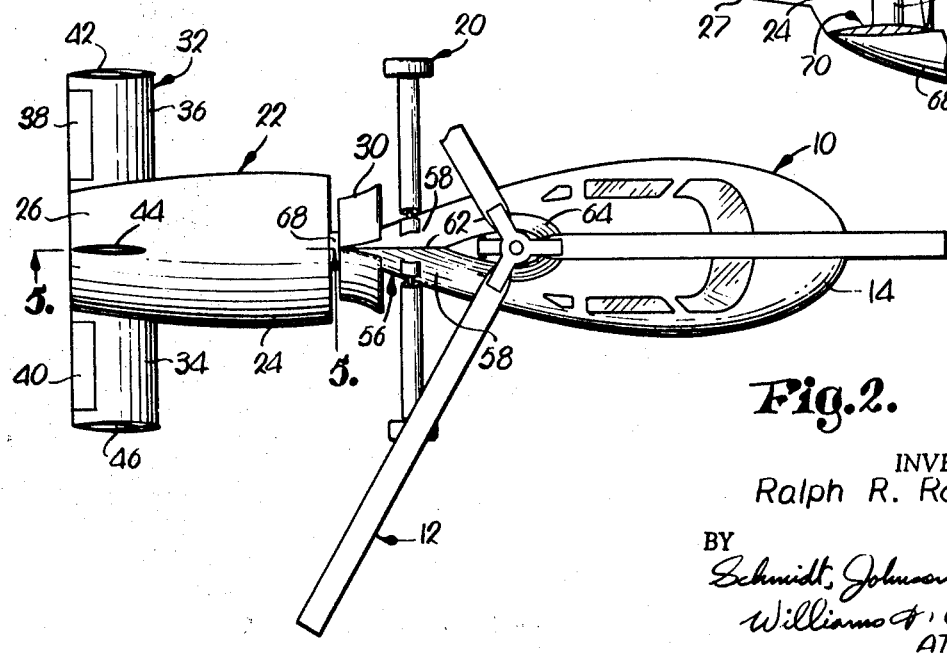
FIG. 2 is a top plan view thereof.

As shown in FIG. 5, the section 24 has an inner surface 70 that is provided with an axial cross-sectional contour conforming substantially to the upper surface of a typical airfoil section. Thus, the minimum inside diameter of section 24 is substantially the same as the maximum outside diameter of the forwardmost edge of sleeve or scoop 30, such contour being disposed to receive the entire slipstream of propeller 28.

The propeller structure and aerodynamic device as shown at 22, 28 and 30 and above described are made in accordance with the broad principles of U.S. Pat. Nos. 2,118,052; 2,330,907; and 2,993,662 issued to Ralph K. Odor, such patents being incorporated herein by reference as need be for a full understanding of my present invention.

Having thus described the invention, what is claimed as new and desired to be secured by Letters Patent is:

I claim:

1. In an aircraft, the combination with an airframe having a rotative sustaining blade of:

an elongated, hollow body carried by and extending rearwardly from said airframe with the longitudinal axis of the body in alignment with the normal path of travel of the aircraft, said body having a tubular leading section and an open bottom, substantially semitubular trailing section;

a power driven screw propeller carried by said body within the leading section for rotation about an axis coincident with said axis of the body; and an air scoop carried by said airframe and disposed to utilize the dynamic pressure of the airstream of the airframe in maintaining a flow of air to said leading section of the body.

2. In an aircraft as claimed in claim 1; and a tail on said trailing section of the body provided with horizontal and vertical stabilizing surfaces.

3. In an aircraft as claimed in claim 2 wherein at least certain of said surfaces are provided with hinged control surfaces.

4. In an aircraft as claimed in claim 1 wherein is provided a power plant in said leading section of the body for driving the propeller.

5. In an aircraft as claimed in claim 1 wherein said airframe includes a fuselage having a rearmost end, said air scoop substantially surrounding said rearmost end of the fuselage.

6. In an aircraft as claimed in claim 5 wherein said air scoop is frustoconical, progressively decreasing in diameter as said body is approached.

7. In an aircraft as claimed in claim 6 wherein said rearmost end of the fuselage progressively decreases in diameter as the air scoop is approached, and is disposed coaxially with said air scoop.

8. In an aircraft as claimed in claim 7 wherein said axis of the body is aligned with the axes of said air scoop and said rearmost end of the fuselage.

9. In an aircraft as claimed in claim 8 wherein said leading section has an inner surface provided with an axial cross-sectional contour conforming substantially to the upper surface of a typical airfoil section.

10. In aircraft as claimed in claim 9 wherein the minimum inside diameter of said leading section is substantially the same as the maximum outside diameter of said scoop, and wherein said contour is disposed to receive the entire propeller slipstream.